Figure 1:
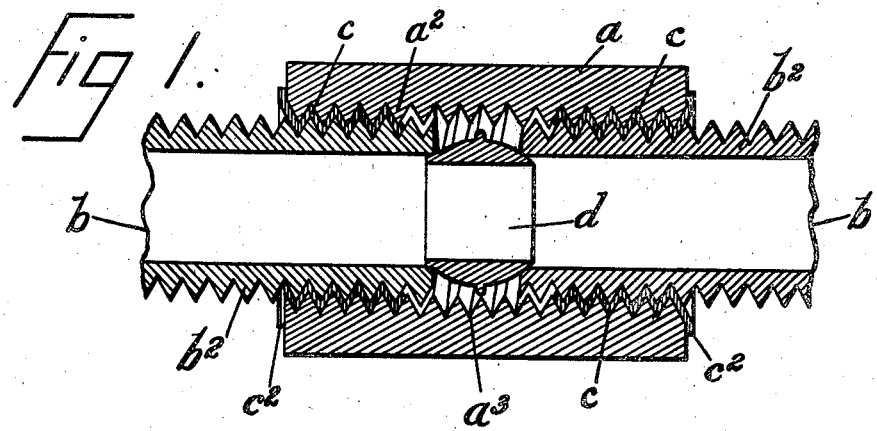

No. 806,156. PATENTED DEC. 5, 1905.
D. MARSHALL.
LOCK FOR NUTS AND BOLTS AND THE LIKE.
APPLICATION FILED MAR. 28, 1905.

2 SHEETS—SHEET 1.

WITNESSES
F. A. Stewart
J. E. Larsen

INVENTOR
Dale Marshall
BY
Edgar Tate & Co
ATTORNEYS

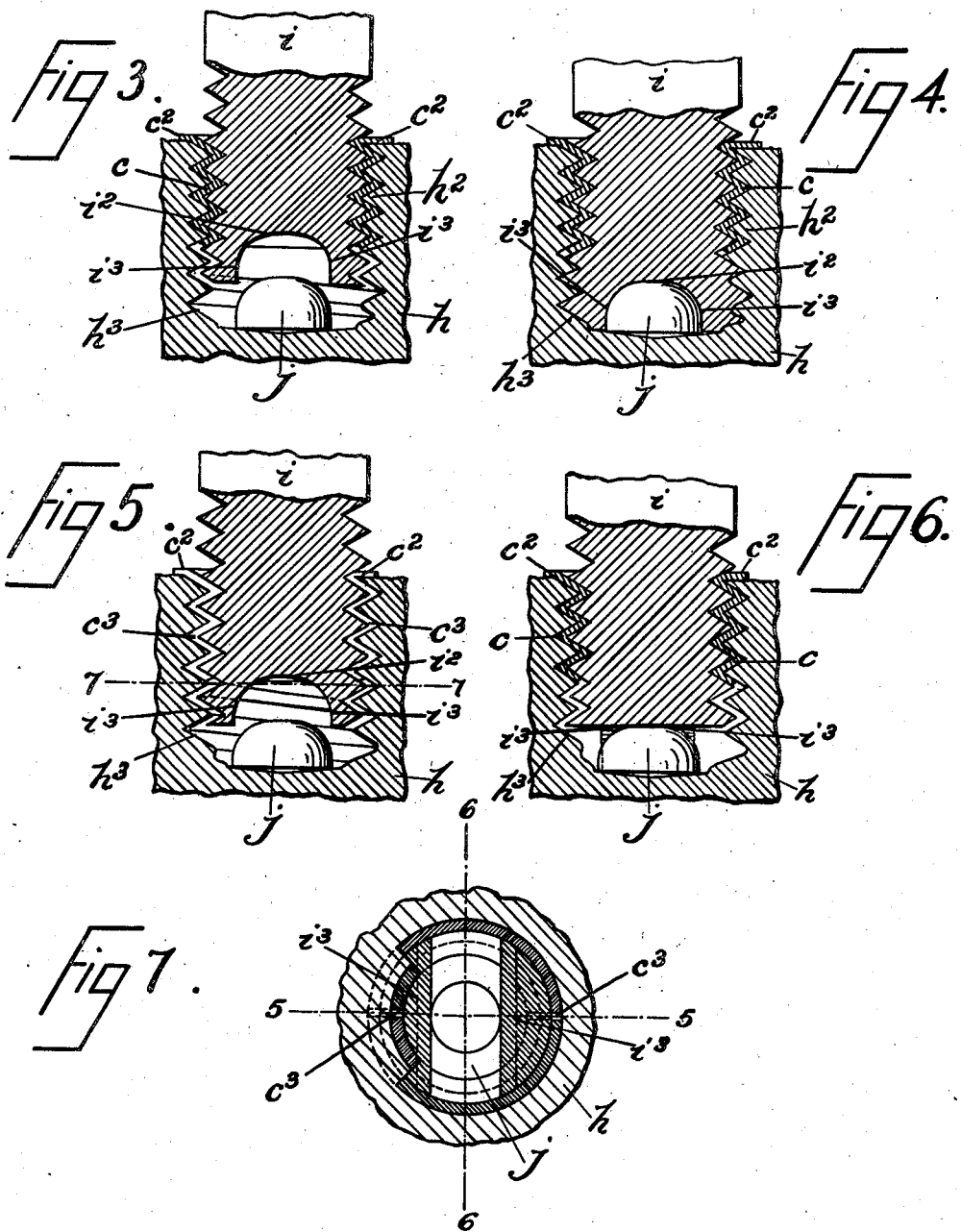

UNITED STATES PATENT OFFICE.

DALE MARSHALL, OF CHELTENHAM, ENGLAND.

LOCK FOR NUTS AND BOLTS AND THE LIKE.

No. 806,156.  Specification of Letters Patent.  Patented Dec. 5, 1905.

Application filed March 28, 1905. Serial No. 252,451.

*To all whom it may concern:*

Be it known that I, DALE MARSHALL, a subject of the King of Great Britain, residing at Cheltenham, in the county of Gloucester, England, have invented certain new and useful Improvements in Locks for Nuts and Bolts and the Like, of which the following is a specification, such as will enable those skilled in the art to which it appertains to make and use the same.

This invention relates to locks for nuts, bolts, studs, pipe-couplings, and the like; and the object thereof is to provide improved devices of this class whereby the desired result is secured by means of a construction which is simple in operation and comparatively inexpensive and which may be applied to any of the various forms of devices specified or to others of the same class.

The invention is fully disclosed in the following specification, of which the accompanying drawings form a part, in which the separate parts of my improvement are designated by suitable reference characters in each of the views, and in which—

Figure 2:
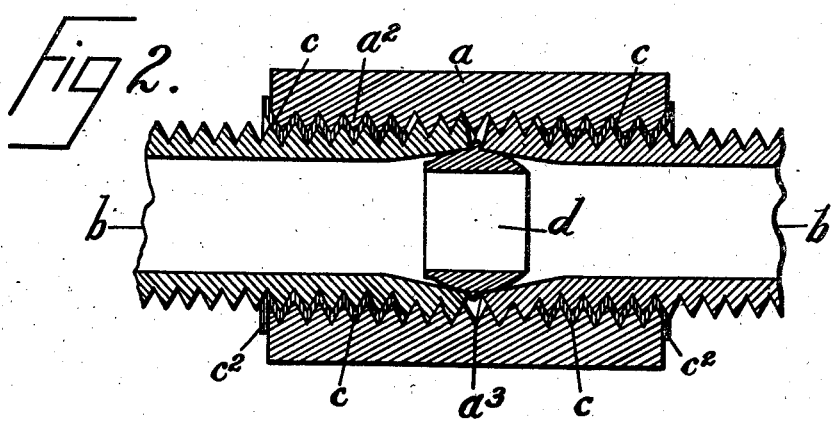

Figure 1 is a sectional side view showing my improvement applied in the operation of coupling two pipes, the coupling being only partially completed; Fig. 2, a view similar to Fig. 1, but showing the coupling completed; Fig. 3, a sectional view showing a modification in which my improvement is applied to the locking of a nut or stud on a bolt or similar device, the parts being only partially connected; Fig. 4, a view similar to Fig. 3, but showing the parts fully connected and the nut or stud locked to the bolt; Fig. 5, a view similar to Fig. 6, but showing another modification, Fig. 5 being also a section on the line 5 5 of Fig. 7; Fig. 6, a section on the line 6 6 of Fig. 7, and Fig. 7 a section on the line 7 7 of Fig. 5.

In Figs. 1 and 2 of the accompanying drawings I have shown my improvement applied for the purpose of coupling the ends of pipes, and for this purpose I provide a tubular coupling $a$, threaded interiorly, as shown at $a^2$, and the ends of the pipes $b$ to be coupled are correspondingly threaded, as shown at $b^2$. I also employ in each end of the coupling $a$ intermediate sleeves or linings $c$, which fit between said coupling and the ends of the pipes $b$, and the sleeves $c$ are threaded externally and internally to correspond with the threads in the coupling $a$ and on the pipes $b$, and said sleeves or linings are also provided at their outer ends in the form of construction shown with flanges $c^2$, which fit on or rest on the ends of the coupling $a$, and placed between the ends of the pipes to be coupled in the coupling $a$ is an expander $d$, which is tubular in form and the end portions of which are beveled to enable them to enter the corresponding ends of the pipes $b$ or to permit said ends of said pipes to be forced onto and expanded thereover.

The sleeves or linings $c$ do not extend to the middle or central portion of the coupling $a$, and the effect of the said sleeves or linings $c$ is to form a central enlarged chamber $a^3$ in the coupling $a$, the said sleeves or linings serving, in effect, to decrease the diameter of the bore through said coupling, and in the operation of screwing the ends of the pipes into the coupling the said ends of the pipes are expanded, as shown in Fig. 2, and enter the central portion $a^3$ of the bore of the coupling, and when the pipes have thus been coupled and the ends thereof expanded they cannot be disconnected from the coupling and will be securely locked within said coupling, as will be readily understood.

In Figs. 3 and 4 I have shown my improved construction employed in locking a stud or nut to a bolt or similar device, and in this form of construction a nut, stud, block, or similar device $h$ is employed and provided with a screw-threaded socket $h^2$, and the bolt or other device $i$ is threaded at the end to correspond with the thread in the nut, stud, or block $h$, and between the threaded end of the bolt or similar device and the nut, stud, or block $h$ is placed one of the sleeves or linings $c$, which is shorter than the socket $h^2$ and by reason of which the inner end of said socket is practically enlarged as shown at $h^3$, the effect of the sleeve or lining $c$ being to decrease the diameter of the screw-threaded socket in the nut, stud, or block $h$. The inner end of the bolt or similar device is also provided with a transverse recess $i^2$, and an expander $j$ is also employed, said expander in the form of construction shown being semispherical or provided with a tapered or rounded surface, and in the operation of screwing the stud, nut, or block onto the bolt or of screwing said bolt into the stud, nut, or block the side portions or projections $i^3$ of the bolt or similar device formed by the transverse recess $i^2$ are expanded into the enlarged or inner end portion $h^3$ of the socket $h^2$ of the nut, and this operates to securely lock the bolt and nut or stud together. The parts $i$ and $h$, however, may be disconnected by turning the stud, nut, or block in the reversed direction and causing the sleeve or lining $c$ to adhere to said nut, stud, or block, and the same result may be accomplished by turning the bolt $i$ in the reversed direction while causing the sleeve or lining $c$ to adhere to the nut, stud, or block; but with this construction the nut, stud, or block will not work off or become accidentally detached.

In Figs. 5 to 7 I have shown a slight modification of the construction shown in Figs. 3 and 4, and in this modification the sleeve or lining $c$ is slitted or slotted longitudinally, as shown at $c^3$, to permit of the expansion or contraction of said sleeve or lining, and this slotting or slitting of said sleeve or lining is employed in the form of construction at both sides of the sleeve or lining, or it may be employed at any desired point therein, and with this exception the construction shown in Figs. 5 to 7, inclusive, is substantially the same as that shown in Figs. 3 and 4.

From the foregoing description it will be apparent that my improvement involves a female member provided with a screw-threaded socket or bore and a male member threaded to correspond therewith and adapted to be screwed thereinto and a sleeve or lining placed between said members and threaded to correspond with each, the sleeve or lining being shorter than the threaded portion of either of said members, and means for expanding the inner end of the male member, and within these limitations various changes in and modifications of the construction herein described may be made without departing from the spirit of my invention or sacrificing its advantages, and the threading of the several parts as herein described is not absolutely essential, as the thread in the female member and the thread on the male member and the threading of the sleeve or lining may all be omitted, and said sleeve or lining may be tubular in form and may be secured in the female member in any desired manner, and with this form of construction the operation and results would be the same as hereinbefore described.

Having fully described my invention, what I claim as new, and desire to secure by Letters Patent, is—

1. In a device of the class described, a female member provided with a threaded bore or socket, a male member provided with a threaded end, a sleeve or lining placed between the threaded portions of said members and shorter than the threaded portion of either of said members, and means for expanding the inner end of the male member, substantially as shown and described.

2. In a device of the class described, a female member provided with a threaded bore or socket, a male member provided with a threaded end, a sleeve or lining placed between the portion of either of said members, and means for expanding the inner end of the male member, consisting of an expander placed in the female member and projecting side portions at the end of the male member, substantially as shown and described.

In testimony that I claim the foregoing as my invention I have signed my name, in presence of the subscribing witnesses, this 2d day of March, 1905.

DALE MARSHALL.

Witnesses:
WILLIAM HOLLOWAY ADAMS,
WALTER COOPER HARRISON.